United States Patent [19]

Ollerenshaw

[11] Patent Number: 4,754,775

[45] Date of Patent: Jul. 5, 1988

[54] DEVICE AND METHOD FOR PREVENTING WATER FROM FLOWING PAST A CLOSED VALVE IN A PIPELINE

[75] Inventor: John E. Ollerenshaw, Ft. Saskatchewan, Canada

[73] Assignee: The Dow Chemical Company, Midland, Mich.

[21] Appl. No.: 135,941

[22] Filed: Dec. 21, 1987

[51] Int. Cl.$^4$ .............................................. F16K 43/00
[52] U.S. Cl. .......................................... 137/1; 137/15; 137/613; 138/89
[58] Field of Search .................. 137/1, 13, 613, 15; 138/89

[56] References Cited

U.S. PATENT DOCUMENTS

| | | | |
|---|---|---|---|
| 4,142,371 | 3/1979 | Mayfield | 138/89 X |
| 4,377,184 | 3/1983 | Vetter | 138/89 |
| 4,494,584 | 1/1985 | Rognoni | 138/89 X |
| 4,607,469 | 8/1986 | Harrison | 138/89 X |

Primary Examiner—Alan Cohan
Attorney, Agent, or Firm—V. Dean Clausen

[57] ABSTRACT

The invention is a sealer unit useful for temporarily preventing water from flowing past a closed valve in a pipeline, such as a butterfly valve. This unit includes a cup-shaped seal member, and a solid plug member that fits inside the seal member. The seal is constructed of a material that swells on contact with water, and the solid plug is derived from a liquid material that can solidify at ambient temperature. The seal member is seated down onto the valve closure plate, and the plug member is formed inside the seal member. The seal member is then contacted with water, causing it to expand outwardly against the pipeline and inwardly against the solid plug member. In its expanded state, the seal member provides an effective seal to prevent water from flowing past the valve. In addition, the solid plug forms a coherent body that enables it to withstand the pressure exerted by the seal member, as it swells, but is capable of being broken into pieces if required.

8 Claims, 4 Drawing Sheets

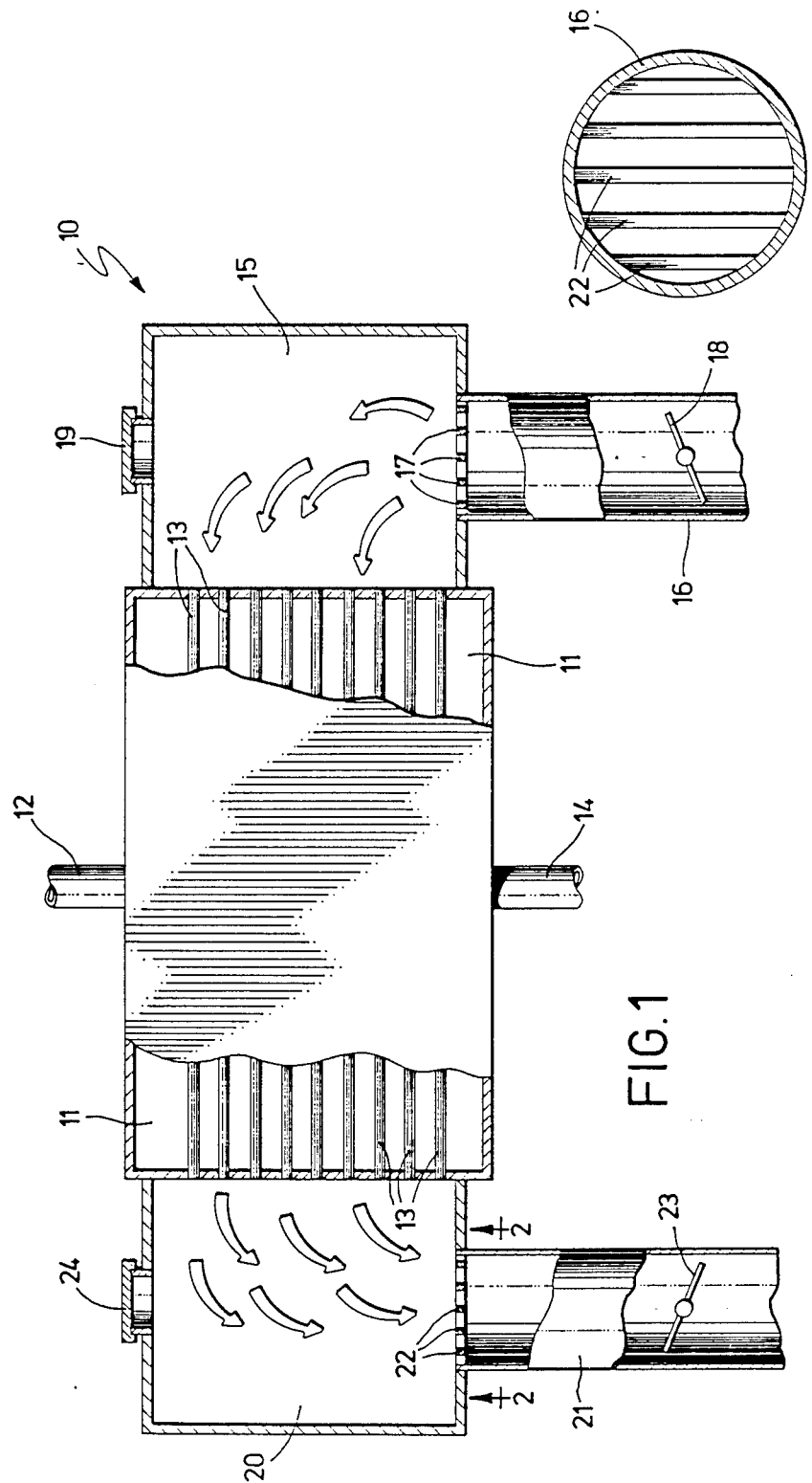

DEVICE AND METHOD FOR PREVENTING WATER FROM FLOWING PAST A CLOSED VALVE IN A PIPELINE

BACKGROUND OF THE INVENTION

The invention relates to a device and method useful for preventing water from flowing past a closed valve in a pipeline. More specifically, the invention is directed to a sealer member, constructed of a water-swellable material, that is seated on the closure member of the valve to prevent water from leaking past the valve.

Large heat exchangers, of the shell and tube type, are part of the equipment used in many electrical power stations, and other industrial facilities. In these exchangers, it is common practice to use water as a cooling medium. The cooling water enters the exchanger through a large pipeline (for example, 48 inches in diameter) that connects into the floor of an inlet plenum. After passing through the tubes, the water leaves the exchanger through an outlet plenum and another similar pipeline in the plenum floor.

A protective metal grid is welded into both the inlet and outlet pipelines at the point where the pipelines are connected into the plenum floor. The space between the bars which form the grid is only about 12 inches. Butterfly valves are installed in each pipeline from about 24 to 60 inches below the protective grid, and these valves can be closed to isolate the heat exchanger from the cooling water supply. Periodically, scale deposits that form in the tubes must be removed. In this operation, the butterfly valves are closed, chemical cleaning agents are added to the water in the tube side of the exchanger, and the solution is circulated through the tubes, using a pump and lines external to the exchanger (not shown), to remove the scale.

A major problem with this procedure is that a substantial amount of the liquid leaks past the butterfly valves. The result is loss of the cleaning solution to the drain through the outlet plenum, and dilution of the solution from ingress of water through the inlet valve. To counter this effect, the active constituents of the solution must be replenished to maintain the solution at its desired strength inside the exchanger. If the outlet valve was sealed, and the exchanger was closed during the cleaning operation, no water could enter through the inlet valve, since it could not pass through to the drain. The gases generated by the cleaning process, mostly carbon dioxide, would be vented to the atmosphere, as needed, to prevent pressure build up in the exchanger.

Attempts to prevent the butterfly valves from leaking have not been successful, because it's extremely difficult to gain access to the valves. For example, the only way to get inside either of the plenums is through a manway that is 24 inches in diameter. And from either plenum the only access to the valve is through the narrow openings in the non-removable grid above each valve. In addition, no suitable device has been available that could be used to alleviate this problem.

SUMMARY OF THE INVENTION

The invention is a sealer unit that prevents the flow of water past a closed valve in a pipeline, in which the valve closure is defined by, but not limited to, a plate that fits inside and crosswise of the pipeline. The sealer unit includes a cup-shaped seal member, constructed of material that swells on contact with water. Seated on the valve closure plate is a flexible sheet member, which is constructed of a water-impervious material. The seal seats down onto the flexible sheet member, or the sheet member can be integral with the seal member.

The flexible sheet member has several functions. For example, it prevents the seal from adhering to the valve closure plate. It also prevents water from contacting the underside of the seal, so that the seal can't swell in this area and displace a plug (described below) that fits inside the seal. This sheet also acts as a support to keep the seal from being cut into sections by a puller means (described below) when the seal is removed from the pipeline.

A flexible, cup-shaped liner member, constructed of a material substantially impervious to water, fits down inside the seal member, either as a loose fit, or it can be temporarily adhered to the seal member. A liquid material capable of solidifying at ambient temperature is poured into the liner member. When the material hardens, it forms a solid plug (as mentioned above) in which the periphery of the plug is in contact with the inside surface of the liner member.

One of the functions of the liner member is to keep the seal from contacting the liquid material from which the plug is formed, to prevent any undesirable chemical reaction. The liner member also provides a means for removing the plug from the pipeline when the cleaning operation is finished. During formation of the plug, the liquid material must solidify to form a coherent body that can withstand the pressure exerted by the seal as it swells. The solid plug must also be capable of being broken into pieces small enough to pass through the metal grid 22 (FIGS. 1 and 2), if this procedure is necessary when the sealer unit is removed from the pipeline 21 (FIG. 1).

The sealer unit also includes two puller means. One of the puller means encloses and is in contact with the liner member; the other puller means encloses and is in contact with the flexible sheet member and the seal member. In the practice of this invention, water is poured onto the seal member until it becomes immersed in water. As the water makes contact with the seal member, it expands outwardly against the pipeline, and also inwardly against the liner member and the solid plug that fits inside the liner member. In its swollen state, the sealer unit forms a seal that prevents water from flowing past the closed valve; but the unit itself is prevented from being displaced along the pipeline by the tendency of the liquid to flow out through the valve.

When it is desired to remove the sealer unit from the pipeline, the first step is to remove the liner member and the solid plug member from their positions inside the seal member, and then pull them out of the pipeline. This is done with the puller means that encloses and is in contact with the liner member. The next step is to remove the flexible sheet member and the seal member from their positions on the valve closure plate, and then pull them out of the pipeline. This is done with the puller means that encloses and is in contact with the flexible sheet member and the seal member.

DESCRIPTION OF THE DRAWINGS

FIG. 1 is an elevation view, mostly in schematic, of a typical shell-and-tube heat exchanger. In this apparatus, butterfly valves at opposite ends of the exchanger are used to control the flow of water through the exchanger.

FIG. 2 is a detail view of a metal grid in the inlet plenum of the heat exchanger of FIG. 1. This view is taken along line 2—2 in FIG. 1.

DESCRIPTION OF THE INVENTION

Figure 3:
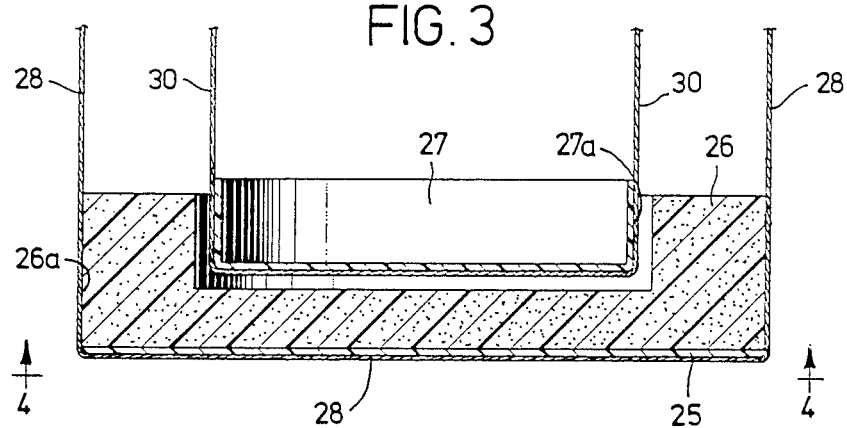
FIG. 3 is an elevation view, mostly in section, that illustrates part of the sealer unit of this invention.

In FIG. 1 of the drawing, numeral 10 indicates generally a heat exchanger of the shell and tube type. As described earlier, heat exchangers of this type are in common use in electrical power stations, and other industrial facilities. As an example of how the exchanger might be used in a power station, steam used to drive the turbines is passed into the shell side 11 of the exchanger through an inlet line 12. As the steam moves through the shell side of the exchanger, it is cooled and condensed by water that is pumped through the tubes 13. The resulting condensate leaves the exchanger through an outlet line 14, and is recycled back to the boilers as feed water.

At the forward end of the heat exchanger 10 is an inlet plenum 15, for directing the cooling water into the exchanger. The water enters the inlet plenum from a large pipeline 16 that connects into the floor of the plenum. At the point where the pipeline joins the floor is a protective metal grid 17, and a butterfly valve 18 is installed in the pipeline below the grid. Grid 17 consists of metal bars welded across the pipeline opening and spaced about 12 inches apart.

At the top of plenum 15 is an access manway 19. At the rear end of the exchanger 10 is an outlet plenum 20, through which the cooling water leaves the exchanger. From plenum 20 the water drains through another large pipeline 21, which is also protected by a metal grid 22. In the pipeline below the grid is another butterfly valve 23, and at the top of plenum 20 is an access manway 24. Grid 22 is illustrated in the detail view of FIG. 2, and like grid 17, it consists of metal bars welded across the pipeline opening and spaced about 12 inches apart.

The sealer unit of this invention, and the placement of the unit on butterfly valve 23 in pipeline 21 is illustrated in FIGS. 3-6. Components of the sealer unit shown in FIG. 3 include a flexible sheet member 25, a cup-shaped seal member 26, and a cup-shaped liner member 27. In the practice of this invention the seal member 26 can be seated loosely down onto the flexible sheet 25, or it can be integral with the sheet. The liner member 27 can fit loosely inside the cup structure of seal member 26, or it can be adhered to the cup structure.

A set of cords 28 (two or more) are fastened across the bottom surface of the flexible sheet 25, so that each cord has two free ends that can be pulled up around the outer wall surface 26a of seal member 26. The cords are fastened to sheet 25 with any suitable fastening means, such as strips of tape 29. Another set of cords 30 are fastened across the bottom surface of the liner member 27, so that the free ends of the cords can be pulled up around the outer wall surface 27a of the liner member 27. The fastening means for cords 30 can be tape, or some other means, as described for the cords 28. The function performed by each set of cords is explained later in this description.

The flexible sheet member 25 and liner member 27 are constructed of a plastic resin material, such as polyethylene, polypropylene, or a MYLAR polyester resin. The seal member 26 is constructed of a fluid-gellable composition of the type described in U.S. Pat. No. 3,502,149 (Pence), which includes a watersoluble or colloid-forming polymer, a polyhydric compound, an oxidizing agent, and water. The teaching in this patent is incorporated herein by reference. The cords 28 and 30 can be constructed of polypropylene, or any other material that is not affected by the temperature or the composition of the cleaning solution. The material should also have enough tensile strength so the cords can pull the sealer parts out of the pipeline 21 (a sequence described later in this paper).

Operation

The practice of this invention can be illustrated by describing use of the sealer unit to prevent water from leaking past the outlet butterfly valve 23, while the heat exchanger is being chemically cleaned. The first step of the operation involves making up the composition for the seal member 26, as described in the Pence patent mentioned above.

In making up the composition, the proportions of all components are adjusted slightly to conform to variables such as ambient temperature, desired toughness of the gel composition, and rate of curing. After the formulation is mixed, it is poured into a mold and allowed to cure to form the cup-shaped seal member 26. The mold (not shown) can be made of wood, plastic, metal, or any other rigid material that won't deteriorate on contact with this formulation. In addition, the mold is lined with a plastic film, or any other kind of material that will keep the mixture from sticking to the inside of the mold. The molding step must take place very shortly after the formulation is mixed, since the composition will become more viscous and start to cure within a few minutes.

Figure 4:
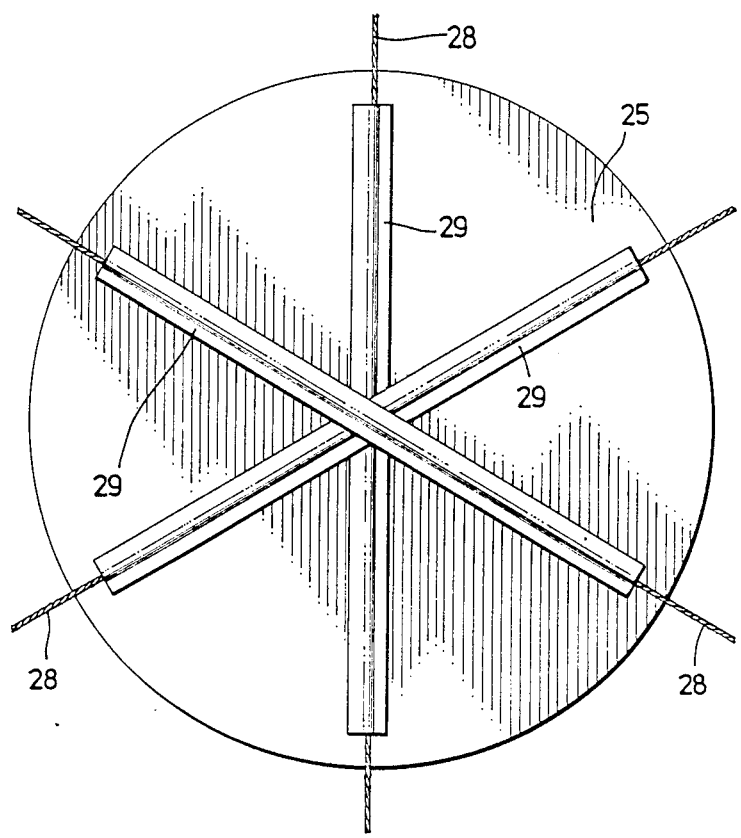
FIG. 4 is a bottom view of the sealer unit shown in FIG. 3, with this view being taken along line 4—4.

The position of the seal member, as it sits in the mold, is reversed from the position shown in the drawings. This means that the bottom surface of the seal member is facing upwardly. While the seal member is in this position, the flexible sheet member 25 is either placed loosely on the bottom surface of the seal member, or it is attached to this surface. The pull cords 28 are then attached to the bottom surface of the sheet member 25, as illustrated in FIG. 4. After the seal member 26 is removed from the mold, the surfaces of the seal are dusted with a powdery material, such as starch, or flour. This material keeps the surfaces from sticking together when the seal member and sheet member have to be folded over so they can pass through the manway 24, and the small openings between the bars in the nonremovable, metal grid 22.

Once the the sheet member 25, the seal member 26, and the liner member 27 are ready for use, all the water is drained out of heat exchanger 10. The next step is to place these members on the butterfly valve 23. The first step is to fold up the members 25, 26, and 27 small enough to get them through the access manway 24 and into the outlet plenum 20. Once these members are inside plenum 20, they have to be folded again to get them through the openings between the bars of the protective grid 22.

Figure 5:
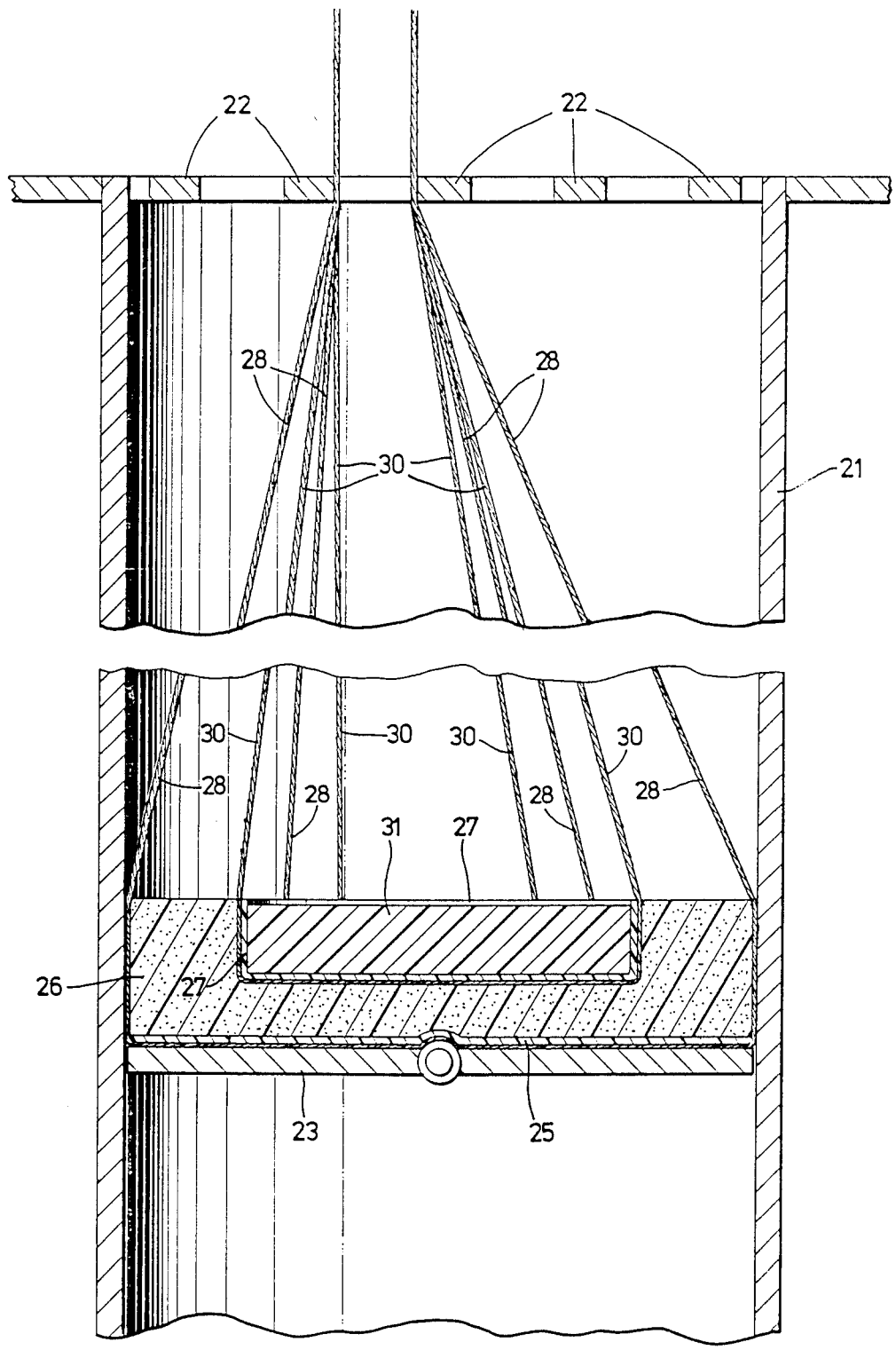
FIG. 5 is an elevation view, in section, of the sealer unit of this invention. In this view the sealer unit is seated on a butterfly valve inside a pipeline below the metal grid shown in FIGS. 1 and 2.
Figure 6:
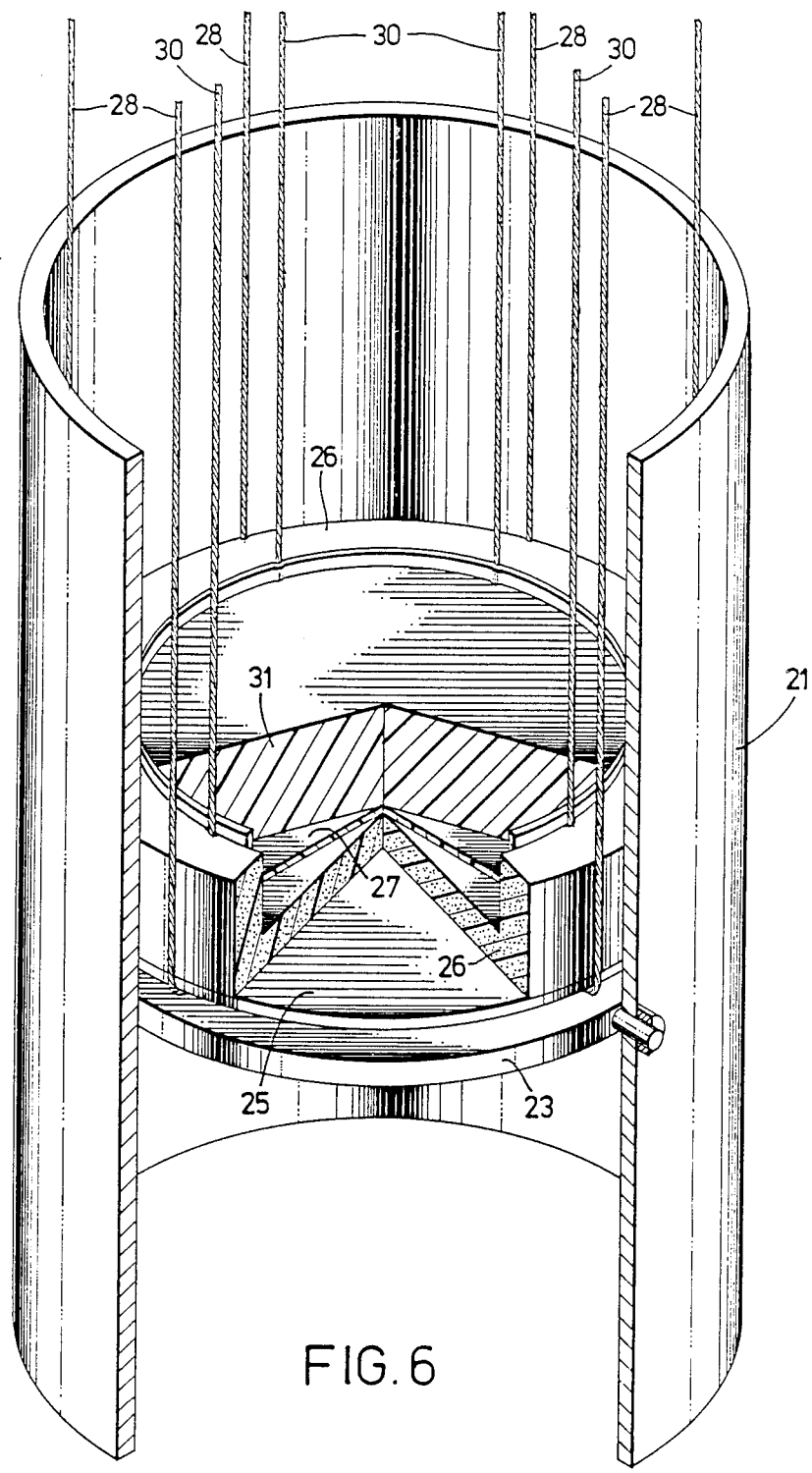
FIG. 6 is an isometric view, mostly in section, of the sealer unit shown in FIG. 5. In this view the sealer unit is in the same position as shown in FIG. 5.

As illustrated in FIGS. 5 and 6, the sheet member 25 and seal member 26 are set into place on top of valve 23. Also, the free ends of pull cords 28 are brought up through the bars in grid 22 and fastened to an anchor member (not shown) inside plenum 20. The liner member 27 is then placed inside the seal member 26 and the free ends of pull cords 30 are also attached to an anchor member (not shown) inside the plenum 20. The liner member 27 is then filled with a liquid polyurethane formulation from a pressurized dispenser (not shown) located above the grid 22. The urethane formulation is a conventional composition that cures rapidly in the presence of water vapor. The liquid is allowed to cure for about one hour, so that it forms a solid plug member 31.

In the sequence described above, the liner member 27 is placed inside the seal member 26 after the seal has been placed on top of valve 23. Another way of assembling these components is to put the liner member and its pull cords into the mold form before casting the seal member. During the casting step, the water-swellable seal member will self-adhere to the liner member, so that the two components form a single unit that can be easily set in place on valve 23. However, since the liner member is only lightly bonded to the seal member, these components can be easily separated for removal from the pipeline.

Water is then poured down into pipeline 21 through grid 22 until the water level reaches not less than three inches above the seal member 26 and plug 31. Since the seal member 26 is constructed of a water-swellable material, it begins to expand immediately. The direction of expansion is outwardly against the inside surface of the pipeline 21, and inwardly against the liner member 27 and the solid plug 31 inside the liner member. After about two hours, the seal member 26 will expand enough to fill up the space between the plug 31 and the inside surface of pipeline 21. When the seal member reaches this condition, the procedure for chemically cleaning the heat exchanger (as described earlier) is carried out.

During the cleaning operation, water in the pipeline 21 above valve 23 tries to drain past the valve but, when the sealer unit is in place, as shown in FIGS. 5 and 6, the water can't reach the valve. Use of the sealer unit, therefore, eliminates the problem of losing the cleaning solution.

After the cleaning operation is completed, the chemical solution is drained out of the heat exchanger 10. The free ends of the pull cords 28 and 30 are untied from their anchor members (not shown) inside the outlet plenum 20. Using the pull cords 30, the liner member 27 and the solid plug 31 are lifted free of the seal member 26 and pulled up through the grid 22. If the plug is too large to pull it through the narrow openings between the grid bars, it can be broken up as it is being removed. The pull cords 30 are then used to lift the sheet member 25 and seal member 26 free of valve 23 and pull them up through the grid 22.

In the practice of this invention, the sealer unit is designed for use as a temporary seal to prevent flow of water through structures in which the confining surfaces of the structure are impervious to water. Examples of such structures are pipelines, conduits, sewers, and tunnels. The sealer unit is particularly useful for installing in structures where access to the water passageways are severely limited, as in the heat exchanger pipelines described herein.

The invention claimed is:

1. A sealer unit for preventing the flow of water past a closed valve in a pipeline, the closed valve having a closure member defined by a plate that fits inside and crosswise of the pipeline, the sealer unit comprising:
   a flexible sheet member that seats down onto the valve closure plate, the sheet member being constructed of a material impervious to water and which does not adhere to the valve closure;
   a cup-shaped seal member that seats down onto the flexible sheet member, the seal member being constructed of a material that will swell on contact with water;
   a flexible, cup-shaped liner member that fits inside the seal member, the liner member being constructed of a material that is substantially impervious to water;
   a solid plug member that fits inside the liner member, the periphery of the plug member being in contact with the inside surface of the liner member, the plug member being derived from a liquid material that can be poured into the liner member, and thereafter solidify at ambient temperature;
   a first puller means that encloses and is in contact with the liner member, the first puller means being adapted for removing the liner member, and the solid plug member, from their positions inside the seal member;
   a second puller means that encloses and is in contact with the flexible sheet member and the seal member, the second puller means being adapted for removing the flexible sheet member, and the seal member, from their positions on the valve closure plate;
   wherein, a liquid composition suitable for the plug member is poured into the liner member and allowed to solidify at ambient temperature, to thereby form the solid plug member;
   the seal member is contacted with water, so that it expands outwardly against the pipeline and inwardly against the liner member and the solid plug member inside the liner member, with the expanded seal member forming a seal that can prevent water from flowing past the closed valve, and the solid plug member defining a coherent body that can withstand pressure exerted by the seal member, but is capable of being broken into pieces if required.

2. The sealer unit of claim 1 in which the liner member has an outer bottom surface and an outer wall surface, the first puller means being defined by at least two pull cords, each pull cord having a central section and free sections on opposite sides of the central section, the central section extending across and being fastened to the outer bottom surface of the liner member, and each free section enclosing and being in contact with the outer wall surface of the liner member.

3. The sealer unit of claim 1 in which the flexible sheet member has an outer bottom surface and the seal member has an outer wall surface, the second puller means is defined by at least two pull cords, each pull cord having a central section and free sections on opposite sides of the central section, the central section extending across and being fastened to the outer bottom surface of the sheet member, and each free section enclosing and being in contact with the outer wall surface of the seal member.

4. The sealer unit of claim 1 in which the flexible sheet member is constructed of a plastic resin compound.

5. The sealer unit of claim 1 in which the seal member is constructed of a fluid-gellable composition that includes a water-soluble or colloid-forming polymer, a polyhydric compound, an oxidizing agent, and water.

6. The sealer unit of claim 1 in which the solid plug member is constructed of a liquid polyurethane composition that solidifies in the presence of water vapor.

7. A method for preventing the flow of water losed valve in a pipeline, the closed valve having a closure member defined by a plate that fits inside and crosswise of the pipeline, the method comprising the steps of:

seating a flexible sheet member down onto the valve closure member, the flexible sheet member being constructed of a material impervious to water and which does not adhere to the valve closure;

seating a cup-shaped seal member down onto the flexible sheet member, the seal member being constructed of a material that will swell on contact with water;

placing a flexible liner member inside the seal member, the liner member being constructed of a material that is substantially impervious to water;

partially filling the liner member with a liquid foam material capable of solidifying at ambient temperature, and in the presence of water vapor; allowing the liquid foam material to remain in the liner member until it turns to a solid material, to thereby provide a solid plug member;

pouring water onto the seal member until it becomes immersed in water; and causing the seal member to expand outwardly against the pipeline and inwardly against the liner member and the solid plug member inside the liner member, with the expanded seal member forming a seal that can prevent water from flowing past the closed valve, and the solid plug member defining a coherent body that can withstand pressure exerted by the seal member, but is capable of being broken into pieces if required.

8. The method of claim 7 which includes the steps of:

providing a first puller means that encloses and is in contact with the liner member;

using the first puller means to remove the liner member, and the solid plug member, from their positions inside the seal member;

providing a second puller means that encloses and is in contact with the flexible sheet member and the seal member; and using the second puller means to remove the flexible sheet member, along with the seal member, from their positions on the valve closure plate.

* * * * *

UNITED STATES PATENT AND TRADEMARK OFFICE
CERTIFICATE OF CORRECTION

PATENT NO. : 4,754,775

DATED : July 5, 1988

INVENTOR(S) : John E. Ollerenshaw

It is certified that error appears in the above-identified patent and that said Letters Patent is hereby corrected as shown below:

Col. 7, line 13 (Cl. 7), insert -- past a closed -- after "water" and delete "losed".

Signed and Sealed this

Twenty-seventh Day of December, 1988

Attest:

DONALD J. QUIGG

*Attesting Officer*   *Commissioner of Patents and Trademarks*